March 28, 1967     K. H. PECH     3,311,381
ROTARY SHAFT SEAL
Filed July 30, 1964
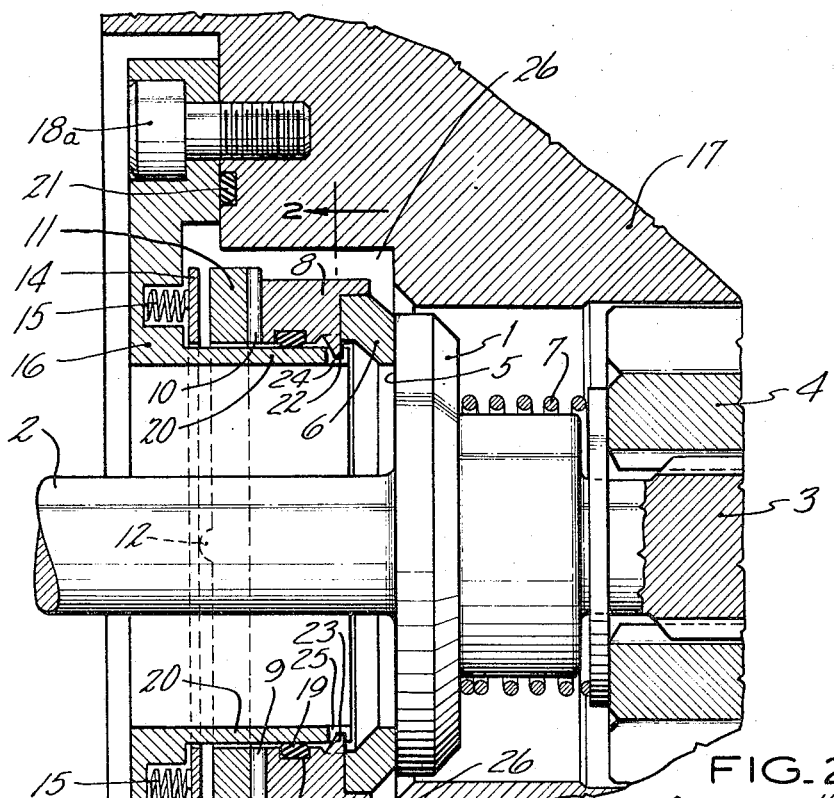
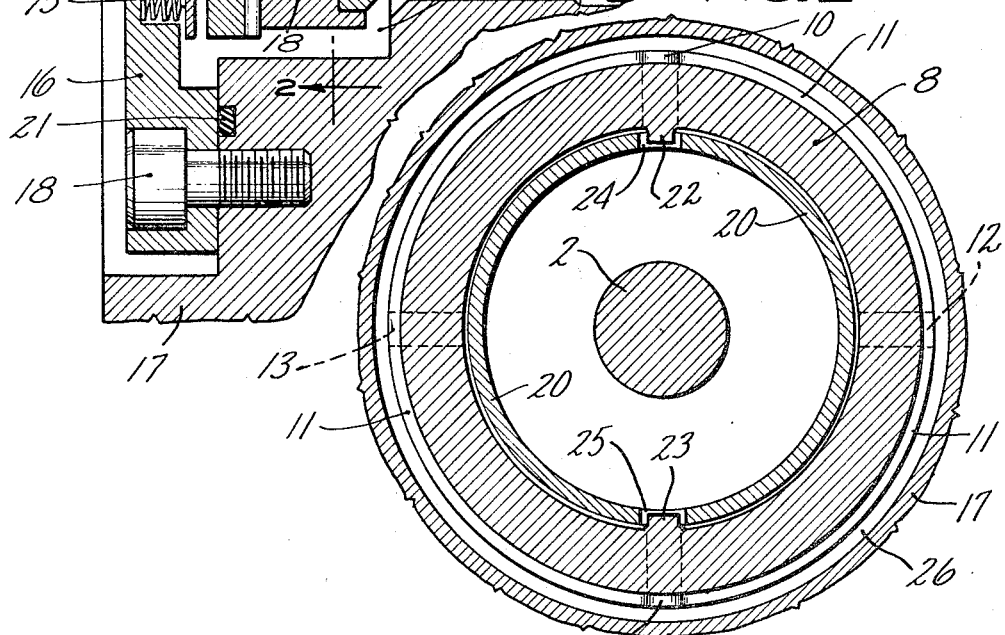
INVENTOR
KARL H. PECH
BY
ATTORNEY Patented Mar. 28, 1967

3,311,381
ROTARY SHAFT SEAL
Karl H. Pech, Simsbury, Conn., assignor to Chandler Evans Inc., West Hartford, Conn., a corporation of Delaware
Filed July 30, 1964, Ser. No. 386,164
4 Claims. (Cl. 277—30)

This invention relates to rotary shaft seals used to prevent the escape of high temperature high pressure fluid between a rotating shaft and a stationary housing; and more particularly this invention pertains to a sealing arrangement that will maintain a substantially centered relationship between the seal guide of a rotating shaft and a nonrotating seal ring wherein the rotating shaft is subjected to both limited axial and angular movement in relation to the seal guide and the stationary housing under conditions varying from zero to high axial thrust loading.

In the art of rotating shaft seals it has been found necessary to provide a large diameter fluid tight rotating shaft seal for a quill containing an integral drive spline larger in diameter than any spline of this type heretofore utilized for a class of high pressure and high speed gear pumps containing an axially floating quill between the pump and the driver mechanism. To facilitate the assembly, disassembly and maintenance of this class of gear pumps it is necessary to remove the quill with the large integral drive spline through the inside diameter of the nonrotating shaft seal elements. The large diameter shaft seal was found necessary to permit the quill with the increased diameter integral spline to be extracted through the inside diameter of the stationary seal elements when the seal unit is removed from the pump housing.

Heretofore, in the art of rotating shaft seals, the large differential pressure across the projected area of the stationary elements of rotating shaft seal combined with an increased seal diameter has created a structural problem within the rotating shaft seal elements such that rupture, distortion or misalignment of the sealing elements has prevented proper fluid tight sealing. Thus, the angular and axial displacement of the rotating shaft in relation to the pump housing when combined with the structural problem associated with the increased seal diameter and increased pump pressure has prevented the utilization of the desired larger diameter seal. Furthermore, all of the elements of these larger diameter rotating shaft seals must be constructed of materials that are highly resistant to corrosion and temperature aging when operated in conjunction with a wide variety of volatile fluids, particularly aromatic fluids. Additionally, in order to insure a fluid tight seal under static conditions when no fluid pressure is present, as well as under dynamic operating conditions, when fluid pressure is present, these larger diameter rotating shaft seals are required to be constructed so that the sealing surface of the nonrotating sealing element will remain in constant complete circumferential engagement with and will constantly conform to the angular and axial displacement of the rotating shaft in a pronounced vibratory environment while simultaneously maintaining a substantially centered position in relation to the stationary housing.

It is the purpose of this invention to solve these rotating seal problems by devising a large diameter rotating shaft seal that structurally will provide improved sealing capabilities between an axially and angularly displaceable rotating shaft and a stationary housing while operating under conditions of increased shaft speed and increased fluid temperature and pressure.

Accordingly one of the principal objects of my invention is to provide a large diameter seal capable of providing a fluid tight sealing arrangement between an axially and angularly displaceable rotating shaft and a stationary housing wherein the displaceable stationary sealing element is maintained in substantially a centered condition relative to a housing, and the sealing surface of the rotating sealing element.

Another object of my invention is to provide a fluid tight rotating shaft seal arrangement of large diameter wherein the sealing surfaces are maintained in constant engagement under conditions varying from zero to a high differential pressure across the face of the sealing unit.

A further object of my invention is to provide a fluid tight rotating shaft seal of large diameter capable of simultaneously withstanding high thrust loads and limited axial and angular misalignment of the rotating sealing surface of a high speed rotating shaft.

Further objects of my invention are to devise a large diameter rotating shaft seal that embodies the following novel features:

(a) Use of a stack arrangement for the stationary elements of a rotating shaft seal whereby the stationary sealing surface that is in engagement with the rotating sealing surface is yieldably supported by a stationary support element such that axial and angular displacement of the rotating sealing surface results in coincident displacement of the stationary sealing surface without distortion of the stationary sealing element.

(b) Use of symmetrically disposed diametrically opposed prongs on the nonrotating element of a rotating shaft seal, wherein the prongs are to be used in conjunction with a support element containing axial slots cooperating with the prongs such that the stationary sealing element that is in contact with the rotating sealing element is prevented from rotating and is maintained in a substantially concentric relationship with a tubular support by operation of accurately located diametrically opposed symmetrical prongs and their similarly located mating slots.

Other and further objects of my invention will become apparent to those skilled in the art as the description proceeds.

With the aforementioned and other objects in view, which may be incidental to my improvements, my invention comprises the combination and arrangement of elements described herein below and illustrated in the accompanying drawing wherein:

FIGURE 1 is a fragmentary axial section view of a pump incorporating the preferred embodiment of my invention.

FIGURE 2 is a sectional view taken substantially along line 2—2 of FIGURE 1.

Referring now to the drawing wherein like characters are used throughout to designate like elements, the rotating sealing surface disclosed therein comprises a rotating disk or flange 1 secured to an axially and angularly displaceable rotating shaft or quill 2. Shaft 2 has splines 3 which engage gear 4, thus connecting shaft 2 to gear 4 inboard of flange 1. It will be appreciated that shaft 2 extends outboard of flange 1 and at its outboard end the large drive spline (not shown) engages a drive mechanism, this drive mechanism being conventional and not shown in the accompanying drawing. The outboard face of flange 1 has a radially disposed sealing face 5 appropriately machined to a flatness and smoothness such that when nonrotating seal ring 6, constructed of carbon or other appropriate material, is pressed against sealing face 5 there will be no leakage between rotating sealing face 5 and nonrotating seal ring 6.

Spring 7 is provided to displace flange 1 and its attached shaft 2 and spline 3 axially outboard with respect to gear 4 and housing 17 so that rotating seal face 5 is urged into engagement with nonrotating seal ring 6. This axial displacement of shaft 2 is provided so that the important function of maintaining constant circumferential sealing engagement between sealing face 5 and seal ring 6 will be accomplished when there is no fluid pressure available, such as when shaft 2 is not rotating, to force seal face 5 into contact with seal ring 6.

The stationary portion of the seal comprises a series of elements arranged and constructed so as to circumscribe stationary tubular seal guide 20 in a sequential relationship or stack wherein stationary seal ring 6 is secured to seal retainer 8 in a fluid tight manner, thus forming a seal element in which seal ring 6 and seal retainer 8 have a fixed relationship to each other. The outboard face of seal retainer 8 engages the two inboard lobes 9 and 10 of wobble washer 11. The two outboard lobes 12 and 13 of wobble washer 11 engage the inboard face of plain washer 14. The two outboard lobes 9 and 10 are diametrically opposed in a fixed relationship on the inboard face of wobble washer 11 and the two outboard lobes 12 and 13 are diametrically opposed in a fixed relationship on the outboard face of wobble washer 11 such that a line connecting the center of the two outboard lobes will be at right angles to a line connecting the center of the two inboard lobes. The operation of wobble washer 11 provides universal type action between the inboard face of plain washer 14 and the nonrotating seal element 6. It has been found during pump installation that heavy grease in the spline of the drive motor may present a condition in which the spring force of spring 7 without the aid of fluid pressure may not be sufficient to overcome the axial load presented by the retarding frictional action of the heavy grease. In the event shaft 2 is subjected to an inboard axial force in excess of the opposing force of spring 7, such that shaft 2 and its attached rotating sealing surface 5 would be displaced from non-rotating seal ring 6, static leakage would result through the gap created between nonrotating seal ring 6 and rotating sealing surface 5. In order to prevent this from happening seal cover 16, which is fastened to housing 17 by bolts 18a, receives springs 15 that engage the outboard face of the plain washer 14 and urge stationary seal ring 6 inboard into engagement with rotating sealing surface 5 by the transmission of spring force through the nonrotating seal stack comprising plain washer 14, wobble washer 11, seal retainer 8 and thence to seal ring 6.

The seal retainer 8 contains a circumferential O-ring groove 18 located on the inner diameter of the seal retainer 8. O-ring seal 19 is contained in groove 18 and is in engagement with the outer diameter of seal guide 20 to effectively make a fluid tight seal between seal retainer 8 and seal guide 20, and yet provide an arrangement whereby seal retainer 8 and its rigidly attached stationary seal ring 6 are permitted to change their position angularly and axially with respect to seal guide 20. It will be noted that seal guide 20 is attached to or integral with seal cover 16 in a manner so as to provide a fluid tight and fixed relationship between housing 17 and seal guide 20. An O-ring seal 21 is provided between seal cover 16 and housing 17 to effectuate a fluid tight seal between these two elements.

It will be noted that if shaft 2 is angularly or axially misaligned in relation to seal guide 20 and so causes rotating flange 1 and its concomitant rotating seal face 5 to change its angular relationship to one other than normal to the axis of rotation of shaft 2, the stationary seal element 6 is free to follow the rotating seal face 5 changing its angular and axial attitude so as to maintain constant circumferential engagement with the complete surface of seal face 6 while moving about yieldable O-ring seal 19 in any axial or angular direction in accompaniment to the regular or axial changes of rotating seal face 5.

It has been found at high sealing pressures the friction between non-rotating seal retainer 8 and rotating seal face 5 cooperating with shaft 2 would cause seal retainer 8 to be eccentrically displaced sufficiently to cause seal retainer 8 to bear on stationary seal guide 20, thus unduly restraining the permissible angular displacement of nonrotating seal retainer 8, resulting in fluid leakage between seal ring 6 and rotating seal face 5. To improve the high pressure fluid tight structural integrity of the nonrotating seal ring 6 and rotating seal face 5 when operated in conjunction with the universal action imparted to nonrotating seal retainer 8 by wobble washer 11, nonrotating seal retainer 8 is provided with two symmetrical diametrically opposed radially inwardly disposed prongs 22 and 23, rigidly secured to seal retainer 8. Diametrically opposed prongs 22 and 23 are accurately positioned in symmetrical relationship to each other and to the center line lying in the plane of the longitudinal axis of nonrotating seal element 8. Prongs 22 and 23 engage matching axial slots 24 and 25 located in seal guide 20, said slots being diametrically opposed and accurately positioned in symmetrical relationship to each other and the center line lying in the plane of the longitudinal axis of seal guide 20. When the frictional engagement of nonrotating seal element 6 and rotating sealing face 5 tends to rotate nonrotating seal element 6, the opposed sides parallel to the plane of the longitudinal axis of the non-rotating seal element 8, of accurately positioned prongs 22 and 23 and the accurately positioned mating areas of engagement of slots 24 and 25 react to maintain seal retainer 8 and nonrotating seal element 6 concentric with respect to seal guide 20. The reaction provides freedom of motion about yieldable O-ring seal 19 under all conditions of operation and thus permits wobble washer 11 to resist an outboard axial force and thereby through the universal action wobble washer 11 permit nonrotating seal ring 6 to accommodate the limited angular misalignment of shaft 2 and rotating seal face 5.

The construction of seal retainer 8 and rotating seal face 5 is such that fluid pressure in cavity 26 will force nonrotating seal element 6 against rotating seal face 5. This action is achieved by arranging stationary seal retainer 8 so that the outboard face of seal retainer 8 presents a larger area exposed to fluid pressure than the inboard side of stationary seal ring 6, due to the sealing of a portion of the inboard side of stationary seal ring 6 with rotating seal element 5, thus producing a differential area and a resulting force unbalance whereby stationary seal ring 6 is urged axially inboard against rotating seal surface 5. The magnitude of this axial force for given range of fluid pressure can be regulated by variation of the magnitude of the differential area.

To illustrate the conditions that may be encountered in such a rotating shaft seal arrangement as herein contemplated, the dynamic fluid pressure in cavity 26 may be 100 p.s.i. with the temperature of the fluid 300° F. and the speed of shaft 2 mayl be 5000 r.p.m. Cavity 26, seal ring 6 and seal retainer 8 may be subjected to a static test pressure at 650 p.s.i. The mean diameter of the face of the large nonrotating seal element may be 1.500 inches with an inside diameter or bore of 1.250 inches, and this seal element may be required to maintain constant complete cricumferential engagement with a rotating sealing surface 5 that may be simultaneously axially displaced .020 inch and angularly displaced 2°, while prongs 22 and 23 and mating slots 24 and 25 are limiting the eccentricity between non-rotating seal-retainer 8 and stationary seal guide 20 to .006 inch. The total clearance between the width of each of the prongs 22 and 23 and the width of its mating slot 24 and 25 may be .010 inch. The total displacement between the center line of diametrically opposed prongs 22 and 23 and the center line of diametrically opposed mating slots 24 and 25 may be .022 inch.

While I have illustrated and described a preferred embodiment of my invention, it is to be understood that such is merely illustrative and not restrictive, and that variations and modifications may be made therein without departing from the spirit and scope of my invention.

I therefore do not wish to be limited to the precise details set forth but desire to avail myself of such changes as fall within the purview of my invention.

What I claim is:

1. Apparatus for sealing a shaft in a housing comprising, a shaft, a flange rigidly connected to said shaft, a housing encompassing said flange, a seal guide fixedly secured to said housing, a sealing element enveloping said seal guide with a radially disposed sealing surface in engagement with said flange, universal joint-like means intermediate said housing and said sealing element constructed and arranged so as to impart a universal motion to said sealing element such that said sealing surface of said sealing element will accommodate limited positional displacement of the axis of said shaft, symmetrical projections fixedly attached to said sealing element and radially inwardly disposed, radially disposed surfaces of said projections in engagement with axially disposed slots in said seal guide such that said sealing element is maintained in a rotatably fixed and a substantially concentric relationship with said seal guide, yieldable fluid sealing means positioned intermediate and encapsuled by said seal guide and said sealing element, resilient means intermediate said universal joint-like means and said housing in singular series force relationship with said universal joint-like means and said sealing element urging said sealing element into engagement with said flange, second resilient means acting on said flange opposite said sealing element and urging said flange into engagement with said sealing element opposing said first resilient means.

2. A rotating shaft seal comprising, a rotating shaft, a flange fixedly connected to said shaft, a housing disposed to contain said flange, a seal guide fixedly attached to said housing and embracing said shaft, a sealing element embracing said guide and having a radially disposed sealing surface in sealing engagement with a radially disposed sealing surface of said flange, wobble washer means enveloping said guide and intermediate said sealing element and said housing constructed and arranged so as to impart a universal motion to said sealing element such that said sealing element will accommodate limiting positional displacement of the axis of rotation of said shaft, yieldable fluid sealing means positioned intermediate and encapsuled by said guide and said sealing element, radially inwardly disposed projections symmetrically positioned in a fixed relationship on said seal element, said projections having radially disposed surfaces inclined to a plane transverse the longitudinal axis of said sealing element, said surfaces in engagement with corresponding axially disposed slots in said guide such that said sealing element is rotatably fixed in relation to said guide and is maintained substantially concentric with said guide, opposing resilient means urging said seal element and said flange into sealing engagement, including first resilient means intermediate said wobble washer means and said housing in singular linear consecutive force relationship with said wobble washer means and said sealing element and, second resilient means in contact with the radially disposed surface of said flange opposite said sealing element.

3. A rotating shaft seal comprising, a rotating shaft with an integral disposed flange thereon, a housing encompassing said flange, a tubular seal guide fixedly secured to said housing, said guide embracing said shaft in spaced relation thereto, a sealing element with a radially disposed annular sealing ring embracing said guide, a wobble washer assembly intermediate said seal element and said housing and radially positioned immediately adjacent the outer circumference of said seal guide and so constructed and arranged that universal joint-like movement is imparted to said sealing element whereby the annular sealing ring of said sealing element is maintained in constant sealing engagement with said axially and angularly displaced shaft, two symmetrical prongs diametrically opposed and fixedly secured to said sealing element, said prongs having contact surfaces inclined to the plane transverse the longitudinal axis of said sealing element and in engagement with axial slots in said guide such that said seal element is rotationally fixed to said guide and is maintained in substantially concentric relationship with said guide, an O-ring intermediate and encapsuled by said sealing element and said guide, a spacer intermediate said housing and said wobble washer, first resilient means intermediate said spacer and said housing in singular direct consecutive force relationship through said spacer, said wobble washer and said sealing element to said flange urging said sealing element into engagement with said flange, second resilient means contacting said flange on the side opposite said sealing element and urging said flange into sealing engagement with said seal element opposing said first resilient means.

4. A rotating shaft seal comprising, a shaft, a flange rigidly connected to said shaft, a housing encompassing said flange, a tubular seal guide fixedly secured to said housing, a sealing element enveloping said seal guide with a radially disposed sealing surface in engagement with said flange, universal joint-like means intermediate said housing and said sealing element positioned immediately adjacent the outer circumference of said seal guide and so constructed and arranged to impart a universal motion to said sealing element such that said sealing surface of said sealing element will accommodate limited positional displacement of the axis of said shaft, said sealing element constructed and arranged so that the complete radially disposed face of said sealing element opposite said sealing face and said universal joint-like means are simultaneously exposed to fluid pressure whereby said fluid pressure interacts with said sealing element and said housing to impart a force urging said sealing element into engagement with said flange, symmetrical projections fixedly attached to said sealing element and radially inwardly disposed, radially disposed surfaces of said projections inclined to a plane transverse the longitudinal axis of said sealing element and in engagement with axially disposed slots in said guide such that said sealing element is maintained in a rotatably fixed and substantially concentric relationship with said seal guide, a spacer circumscribing said seal guide intermediate said housing and said universal joint-like means, yieldable fluid sealing means intermediate and encapsuled by said seal guide and said sealing element, first resilient means intermediate said spacer and said housing in singular direct consecutive axial force relationship with said spacer, said universal joint-like means and said sealing element urging said sealing element into engagement with said flange, second resilient means acting on said flange opposite said sealing element and urging said flange into engagement with said sealing element opposing said first resilient means.

References Cited by the Examiner
UNITED STATES PATENTS

| | | | |
|---|---|---|---|
| 2,434,589 | 1/1948 | Roth | 277—91 X |
| 2,515,410 | 7/1950 | Laas | 277—71 X |
| 3,024,048 | 3/1962 | Kobert | 277—12 |
| 3,090,627 | 5/1963 | Tankus | 277—85 |

LAVERNE D. GEIGER, *Primary Examiner.*

SAMUEL ROTHBERG, B. KILE, *Assistant Examiners.*